June 29, 1943.　　　　M. GOLDSCHMIDT　　　　2,322,844
RUBBER AND METAL UNIT FOR RESILIENT
MOUNTINGS, COUPLINGS, AND THE LIKE
Filed July 2, 1942　　　　2 Sheets-Sheet 1

Max Goldschmidt

June 29, 1943.  M. GOLDSCHMIDT  2,322,844
RUBBER AND METAL UNIT FOR RESILIENT
MOUNTINGS, COUPLINGS, AND THE LIKE
Filed July 2, 1942  2 Sheets-Sheet 2
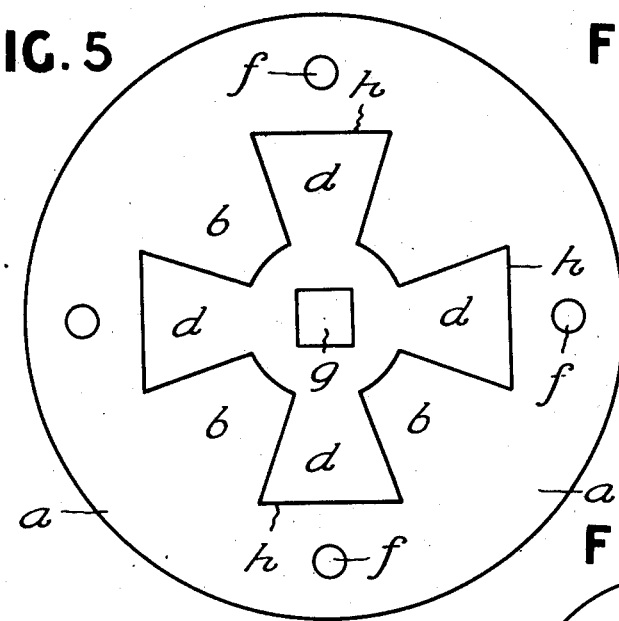
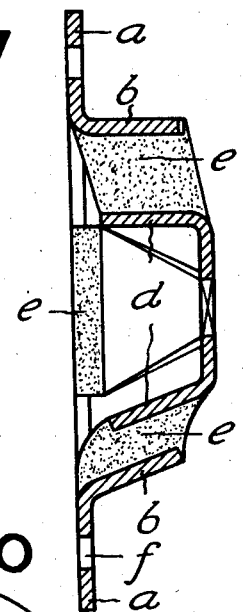
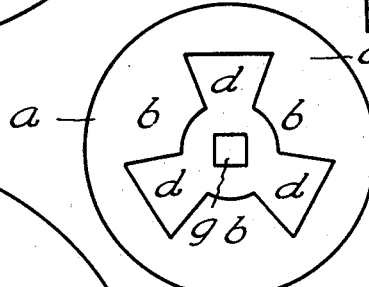
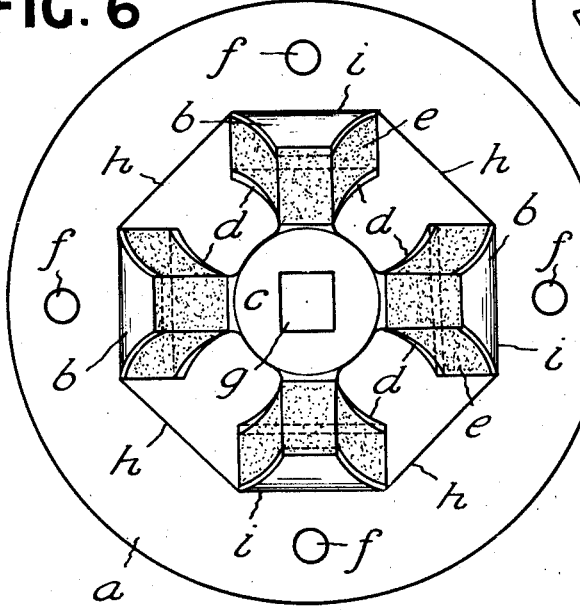
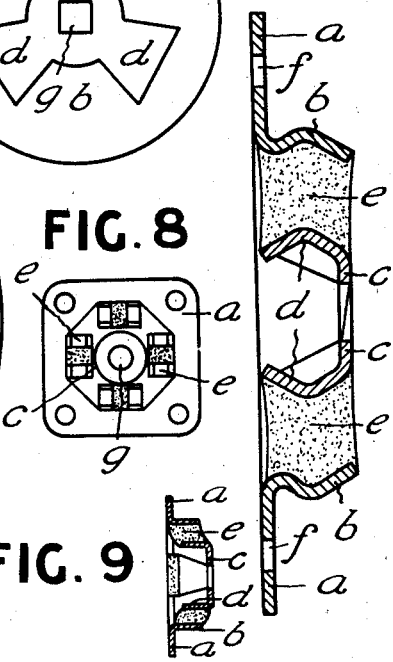
Max Goldschmidt
By Harness Dickey & Pierce
attys Patented June 29, 1943

2,322,844

UNITED STATES PATENT OFFICE 2,322,844

RUBBER AND METAL UNIT FOR RESILIENT MOUNTINGS, COUPLINGS, AND THE LIKE

Max Goldschmidt, Leicester, England, assignor to Metalastik Limited, Leicester, England, a British company Application July 2, 1942, Serial No. 449,380
In Great Britain February 26, 1941

6 Claims. (Cl. 248—358)

Rubber and metal units in which the metal parts form attachment plates or means by which the unit can be mounted between two surfaces, and the rubber forms a resilient connection between the metal parts and is bonded to them by a vulcanisation process giving a very strong union, are well known.

It is an object of the present invention to produce a rubber and metal resilient mounting or coupling unit of the kind set forth above which consists of two metal parts, one having inwardly projecting arms pressed integrally with a peripheral attachment rim and the other having outwardly projecting arms pressed integrally with an attachment centre, these arms being so arranged on their respective parts that when the two parts are assembled coaxially the arms can be brought face to face and are then united by rubber blocks located between them and bonded to the opposed metal faces so as to form the connection between the parts.

It is also an object of the present invention to produce a unit of the above mentioned kind wherein the metal parts comprise a peripheral attachment part and a central attachment part, in which the parts that receive the rubber and the attachment portions of both metal parts are pressed from one metal sheet or plate, the blank for the one part being formed by the metal displaced from the sheet or plate in forming the other metal part.

It is preferred that the one part shall be formed entirely from metal lying well within the perimeter of the other part and that the attachment part of the former part shall be central and that of the latter part peripheral, with the connecting arms that will receive the rubber lying intermeshed when the parts are in the flat.

By this means both attachment parts may be continuous metal members such as rings, or polygonal or rectangular frames for the one part with inwardly directed arms, and discs or frames with outwardly directed arms for the other part. This makes stronger structures from any given thickness or quality of metal.

As one simple example of construction we may stamp out a plate of the size required for the attachment part of the larger member, and pierce this blank by appropriate press tools to remove a maltese cross-like figure from the centre, leaving the surrounding outer part of the plate unmutilated except for the formation of holes for attachment screws or bolts. The maltese cross-like smaller member which is displaced from the plate has a central, flat disc in which a square or other hole for attachment purposes may be formed.

Projecting inwardly from the circular plate of the larger member are four equally spaced inwardly tapering arms, and radiating out from the flat disc of the smaller member are four outwardly increasing arms. The arms of both parts may be pressed out from the flat at suitable complementary inclinations or curves, or at right angles thereto and the smaller part will be assembled coaxially with the larger part and with its arms facing opposite the arms of the larger part in order that rubber pads or blocks may be bonded to the facing surfaces of all the arms.

The complete rubber and metal unit thus formed may then be mounted between a supporting surface and an article or between two rotary members to be coupled, with the larger metal attachment part secured to the one surface and the smaller disc like part secured to the other with their arms connected together by the rubber. The unit lends itself to use in almost any form of resilient mountings or couplings whether designed for loading the rubber in compression, tension, torsion, or shear, or combinations thereof; and the particular bending or setting of the arms to the perpendicular position, inclines, curves, angle sections or the like may be chosen to give the best response of the rubber to its conditions of loading.

The arms need not be set out from the plates for some uses.

The appended drawings illustrate various constructional forms of the invention.

Figures 5 and 6 are similar views to Figures 1 and 3 but showing the piercing of the blank and the pressing out of the arms made on straight lines.

Figure 7 is a cross section illustrating two forms of construction, with perpendicular arms on the left of the figure and inclined arms on the right.

Figures 8 and 9 are respectively plan and cross section of a unit with a square outline.

Figure 10 shows a blank for a three armed arrangement.

Figure 11 is a sectional view of a unit showing the arms of the members of angular section in a plane parallel with the axis.

Figure 1:
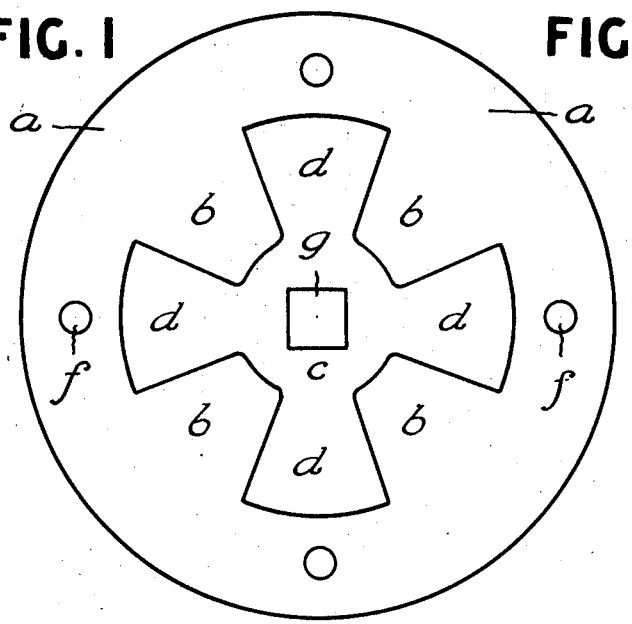
Figure 1 is a plan of a pierced blank.
Figure 2:
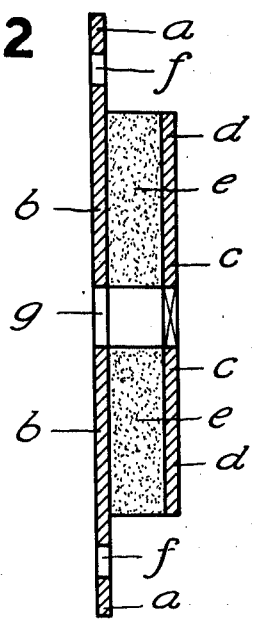
Figure 2 is a section through the rubber and metal unit of simplest form made therefrom.

In Figure 1 the metal plate is circular and a maltese cross shaped blank is stamped out of the central part leaving a ring like blank with inwardly projecting arms. The ring like blank is marked $a$ and its inwardly projecting and tapering arm $b$ while the cruciform blank as marked $c$ and its arms $d$. The two blanks are coaxially assembled with the arms of the blank $c$ turned through an angle of 45° to bring them exactly opposite the arms $b$ of the blank $a$. In this position rubber may be bonded directly to the opposing faces of the arms to form the unit shown in Figure 2 in which $e$ represents the rubber which may be in ring form or in four blocks conforming in shape with the arms $b$ and $d$. Holes $f$ in the member $a$ enable this member of the unit to be secured by bolts, screw or like means to a surface, and a hole such as the square hole $g$ will enable the member $c$ to be secured and keyed against turning on another part such as a shaft.

Figure 4:
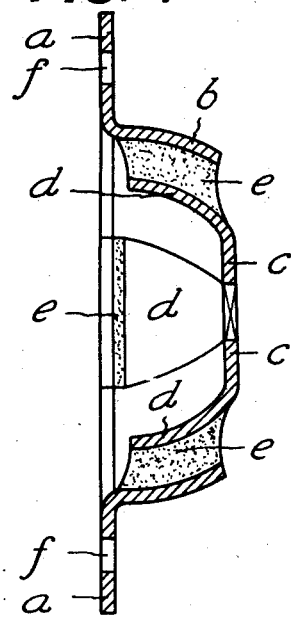
Figure 4 is a cross section through an assembled unit of the form shown in Figure 3 but with the arms complementarily curved from the shoulder to the end.
Figure 3:
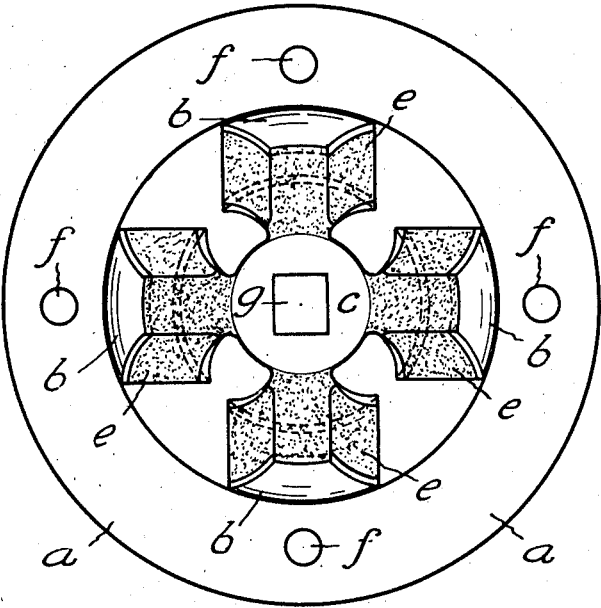
Figure 3 is a plan of an assembled unit in which the arms are pressed out from the plane of the two blanks made from the pierced blank shown in Figure 1 and are slightly curved circumferentially.

The arms $b$ and $d$ may be pressed out of the main plane of the respective blanks as shown in Figures 3 and 4 and this is the preferred arrangement. With the faces of the free ends of the arms $d$ of the small blank $c$ cut to a curve as shown in Figure 1, the blanks may be pressed so that the arms $b$ and $d$ have circumferential curvature, i. e. in a direction transverse to a line from root to tip. The arms at the roots where they bend from the flat blanks will then be part of a circle as seen in the face view, Figure 3.

The arms $b$ and $d$ may also be curved in the direction of the length of the arm from root to tip as more clearly shown in the cross sectional view, Figure 4.

In Figures 5 and 6 the blanking out operation is carried out so as to make a straight cut at $h$ where the ends of the arms $d$ are formed and the arms $b$ are shown bent out from the blank on a chord at $i$ instead of the curve as in Figure 3. Otherwise this construction resembles the construction illustrated in Figures 3 and 4.

In these arrangements, Figures 3 to 6, the inner smaller blank $c$ is assembled with its flat disc-like part remote from the blank $a$ and the ends of its arms adjacent the roots of the arms $b$; this renders the arms complementary to each other with the broad parts facing each other so that an approximately truncated triangular shaped rubber block $e$ will conform in shape with a pair of opposed arms between which it is bonded.

As shown in the lower part of the sectional view at Figure 7 the arms $b$ and $d$ may be complementary inclines or as shown in the left upper part of that figure they may be perpendicular to the main plane of the respective metal parts $a$ and $c$.

Figures 8 and 9 show a square blank $a$ with arms $b$ and $d$ perpendicular to the blanks $a$ and $c$.

In Figure 10 a blank for a three armed unit is shown instead of the cruciform arrangement previously described but the construction otherwise is the same.

As Figure 11 shows, the arms $b$ and $d$ need not be simple straight or curved arms but may be pressed with crankings or angular section in the direction of their length.

The arms need not be stamped so as to use the whole of the metal in the original plate from which the two blanks $a$ and $c$ are formed. The overlapping arms may be of less width leaving scrap metal between them where the load to be resiliently taken by the rubber is not so large.

As will be seen from the form illustrated in Figure 3 the inner metal member may have some movement in all directions, in the manner of a so-called universal joint, relatively to the outer metal part; the rubber blocks would then be stressed in torsion, partly in shear, in compression and in tension according to the angular relative movements of the inner and outer parts.

The manufacture of the mounting unit is economical as the scrap metal from one blanking operation is utilised for the smaller metal part.

It will be obvious that the number of arms of the mounting may be reduced or multiplied to suit particular designs of mounting.

The term rubber is used to cover suitable compounds of it with other substances and synthetic rubber preparations where they are applicable.

I claim:

1. A rubber and metal unit for resilient mountings, couplings and the like, comprising in combination two metal parts: a peripheral part in which attachment means are provided, said part having four arms cranked out from the normal plane of the peripheral part, and a central part with four arms cranked out from a central plate part which is provided with attachment means, said parts being assembled with the peripheral part of one and the central part of the other in spaced planes and with their arms oppositely directed and facing each other, and with rubber connecting elements bonded to the outermost faces of the arms of the central part and to the innermost faces of the arms of the peripheral part.

2. A unit resilient element, including, in combination, a pair of parts having arms extending in opposite directions from the supporting portions thereof, said parts being complementary when flat and being curved along their longitudinal and transverse dimensions, said parts being disposed in spaced relation with the arms aligned, and resilient elements joining said arms.

3. A resilient mounting or coupling comprising a substantially circular metal disc having a substantially cross-shape cut out opening therein with the center of the opening substantially at the center of the disc, said disc having inwardly projecting arms between the outwardly extending legs of the opening, the cut out portion of the disc forming a second metal part shaped substantially in accordance with the opening in the first part and having outwardly projecting arms axially aligned with the arms of the disc, and rubber between each pair of axially aligned arms and connected thereto.

4. A rubber and metal mounting or coupling comprising a metal plate having a cut-out opening therein with the center of the opening substantially at the center of the plate and with the opening shaped to form an outer endless attaching rim and circumferentially spaced arms projecting from the inner edge of said rim, the cut-out portion of the plate forming a second metal part shaped substantially in accordance with the opening in the first part and having a central attaching portion and arms projecting from the attaching portion, the arms of one part being disposed in face to face relation respectively to the arms of the other part, and rubber between each pair of facing arms and connected thereto.

5. A resilient mounting or coupling comprising an outer sheet metal part having a cut-out opening therein shaped to provide an endless outer rim, arms projecting from the inner edge of the rim, and a central recess, the cut-out portion of the first member forming a second metal part shaped substantially in accordance with the cut-out opening in the first part so as to provide a central attaching portion and projecting arms disposed in face to face relation with the arms on the first part respectively, and rubber between the faces of the arms and connected thereto so as to resiliently connect the arms of one part to the arms of the other.

6. A rubber and metal mounting or coupling comprising a substantially circular metal disc having a cut-out opening therein with the center of the opening substantially at the center of the disc and with the opening shaped to form an outer annular attaching rim and circumferentially spaced arms projecting from the inner edge of said rim, the cut-out portion of the disc forming a second metal part shaped substantially in accordance with the opening in the first part and having a central attaching portion and arms projecting from the attaching portion, the arms of one part being disposed in face to face relation respectively to the arms of the other part, and rubber between each pair of facing arms and connected thereto, said arms being bent in a direction axially of the disc with each pair of facing arms disposed in radially spaced relation.

MAX GOLDSCHMIDT.